United States Patent
Chung (10) Patent No.: US 12,417,774 B2
(45) Date of Patent: Sep. 16, 2025

(54) SYSTEM MONITORING BY PLAYING SOUND

(71) Applicant: International Business Machines Corporation, Armonk, NY (US)

(72) Inventor: Albert Alexander Chung, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 17/658,094

(22) Filed: Apr. 6, 2022

(65) Prior Publication Data

US 2023/0326471 A1    Oct. 12, 2023

(51) Int. Cl.
*G10L 19/02* (2013.01)
*G10L 19/005* (2013.01)
*G10L 19/08* (2013.01)

(52) U.S. Cl.
CPC ........ *G10L 19/0212* (2013.01); *G10L 19/005* (2013.01); *G10L 19/08* (2013.01)

(58) Field of Classification Search
None
See application file for complete search history.

(56) References Cited

U.S. PATENT DOCUMENTS

| | | |
|---|---|---|
| 7,111,241 B2 | 9/2006 | Takats et al. |
| 7,137,074 B1 | 11/2006 | Newton et al. |
| 7,171,466 B2 | 1/2007 | Van Der Meulen |
| 7,839,268 B2 | 11/2010 | Outlaw et al. |
| 7,940,162 B2 | 5/2011 | Shaouy |
| 9,489,866 B2 | 11/2016 | Wohlert et al. |
| 10,505,793 B2 | 12/2019 | Yin |
| 2006/0269086 A1* | 11/2006 | Page ..................... H04H 60/04 381/119 |

(Continued)

FOREIGN PATENT DOCUMENTS

WO    2016131793 A1    8/2016

OTHER PUBLICATIONS

P.A. Lynn, The Laplace Transform and the Z-Transform, in Electronic Signals and Systems (Palgrave, London, 1986) ("Lynn") (Year: 1986).*

(Continued)

*Primary Examiner* — Walter F Briney, III
(74) *Attorney, Agent, or Firm* — James Olsen; Andrew D. Wright; Calderon Safran & Wright P.C.

(57) ABSTRACT

A computer-implemented method, a computer program product, and a computer system for system monitoring. A computer system convert a time domain representation of first sound into a frequency domain representation, maps monitoring datasets of a monitored system to frequencies in the frequency domain representation, modifies the amplitudes of the respective frequencies according mapping rules defined by a user, convert the frequency domain representation into the time domain representation and generate a sound wave in a digital format which has modified amplitudes, converts the sound wave in the digital format to a sound wave in an analog format, and feeds the sound wave in the analog format to a sound system to play second sound. Performance of the monitored system is monitored by the user listening to the second sound and comparing the first and second sound.

20 Claims, 5 Drawing Sheets

(56) References Cited

U.S. PATENT DOCUMENTS

| | | | |
|---|---|---|---|
| 2009/0051507 A1* | 2/2009 | Outlaw | G06F 11/0748 340/384.1 |
| 2010/0075806 A1* | 3/2010 | Montgomery | G09B 19/003 600/23 |
| 2010/0136950 A1* | 6/2010 | Backlund | H04M 1/72436 455/412.1 |
| 2017/0370974 A1 | 12/2017 | Liang | |
| 2020/0349248 A1 | 11/2020 | McNulty et al. | |
| 2023/0280820 A1* | 9/2023 | Sukumaran | G06F 1/329 713/324 |
| 2023/0281070 A1* | 9/2023 | Harutyunyan | G06F 18/214 714/37 |

OTHER PUBLICATIONS

"Patent Cooperation Treaty PCT Notification of Transmittal of the International Search Report and the Written Opinion of the International Searching Authority, or the Declaration", Applicant's file reference P202105570, International application No. PCT/EP2023/057765, International filing date Mar. 27, 2023, Date of mailing Jun. 29, 2023, 12 pages.

Henthorne et al., "Sonifying Performance Data to Facilitate Tuning of Complex Systems", Onward! 2010, Oct. 17 -21, 2010 Reno/Tahoe, Nevada, USA, 8 pages.

Hahn, Michael, "Suspended Chords: Create Tension with Sus4 and Sus2", LANDR Blog, published Mar. 4, 2020 , 10 pages, <https://blog.landr.com/suspended-chords>.

Mcfee et al., "librosa: Audio and Music Signal Analysis in Python", Proc. of The 14th Python in Science Conf. (SCIPY 2015), 7 pages.

Mell et al., "The NIST Definition of Cloud Computing", NIST National Institute of Standards and Technology U.S. Department of Commerce, Special Publication 800-145, Sep. 2011, 7 pages.

Nogueira, Goncalo, "Tension and Release—the fundamental way we listen to music", medium.com ("Harmonic tension" subheading), published Oct. 17, 2020, 14pages, <https://medium.com/the-gleaming-sword/tension-and-release-the-fundamental-way-we-listen-to-music-46406dce5fd3>.

Scapelliti, Christopher, "Why Do Major Chords Sound Happy", Guitar World, published Aug. 4, 2016, 12 pages, <https://www.guitarworld.com/lessons/why-do-major-chords-sound-happy>.

Wikipedia, "Discrete Fourier transform", page was last edited on Feb. 11, 2022, 18 pages, <https://en.wikipedia.org/wiki/Discrete_Fourier_transform>.

Wikipedia, "Fourier Transform", page was last edited on Feb. 15, 2022, 39 pages, <https://en.wikipedia.org/wiki/Fourier_transform>.

Wikipedia, "Sampling (music)", page was last edited on Feb. 17, 2022, 9 pages, <https://en.wikipedia.org/wiki/Sampling_(music)>.

* cited by examiner

SYSTEM MONITORING BY PLAYING SOUND

BACKGROUND

The present invention relates generally to system monitoring, and more particularly to system monitoring by playing sound/music which is used to represent internal states of a monitored system in near real-time.

Considering a software system, observability is a measure of how well the internal states of the software system can be inferred by analyzing its external outputs. The software system observability has three pillars: metrics, traces, and logs. For a complex software system, there can be many datasets from different data sources, perhaps hundreds or more. For example, metric datasets include container CPU (central processing unit) utilization, memory consumption, disc usage, and network traffic, and trace datasets include dependency relationships and trace spans. There are various tools to render these datasets in a visual way. For example, Grafana (a multi-platform open-source analytics and interactive visualization web application) is a tool to render metrics visually, and Jaeger (open-source software for tracing transactions between distributed services) is a tool for visually rendering traces and dependencies etc.

Monitoring a software system visually and continuously by humans can be quite tiring and boring. It requires high level of concentration to spot anomalies on graphs that are continuously changing. This problem is magnified if there are many graphs to be observed at the same time.

SUMMARY

In one aspect, a computer-implemented method for system monitoring is provided. The computer-implemented method includes convert a time domain representation of first sound into a frequency domain representation. The computer-implemented method further includes mapping respective monitoring datasets of a monitored system to respective frequencies in the frequency domain representation. The computer-implemented method further includes modifying amplitudes of the respective frequencies, according to one or more mapping rules defined by a user. The computer-implemented method further convert the frequency domain representation into the time domain representation, to generate a sound wave in a digital format which has modified amplitudes. The computer-implemented method further converting the sound wave in the digital format to a sound wave in an analog format. The computer-implemented method further feeding the sound wave in the analog format to a sound system, to play second sound. Performance of the monitored system is monitored by the user listening to the second sound and comparing the first sound and the second sound.

In another aspect, a computer program product for system monitoring is provided. The computer program product comprises a computer readable storage medium having program instructions embodied therewith, and the program instructions are executable by one or more processors. The program instructions are executable to: convert a time domain representation of first sound into a frequency domain representation; map respective monitoring datasets of a monitored system to respective frequencies in the frequency domain representation; modify amplitudes of the respective frequencies, according to one or more mapping rules defined by a user; convert the frequency domain representation into the time domain representation, to generate a sound wave in a digital format which has modified amplitudes; convert the sound wave in the digital format to a sound wave in an analog format; feed the sound wave in the analog format to a sound system to play second sound, where performance of the monitored system is monitored by the user listening to the second sound and comparing the first sound and the second sound.

In yet another aspect, a computer system for system monitoring is provided. The computer system comprises one or more processors, one or more computer readable tangible storage devices, and program instructions stored on at least one of the one or more computer readable tangible storage devices for execution by at least one of the one or more processors. The program instructions are executable to convert a time domain representation of first sound into a frequency domain representation. The program instructions are further executable to map respective monitoring datasets of a monitored system to respective frequencies in the frequency domain representation. The program instructions are further executable to modify amplitudes of the respective frequencies, according to one or more mapping rules defined by a user. The program instructions are further executable to convert the frequency domain representation into the time domain representation, to generate a sound wave in a digital format which has modified amplitudes. The program instructions are further executable to convert the sound wave in the digital format to a sound wave in an analog format. The program instructions are further executable to feed the sound wave in the analog format to a sound system, to play second sound. Performance of the monitored system is monitored by the user listening to the second sound and comparing the first sound and the second sound.

DETAILED DESCRIPTION

Embodiments of the present invention disclose an approach that enables a user to monitor performance of a software system by listening to sound or music of user's choice. By listening to sound or music, a user can infer the internal state of the system in near real-time. If a software system performs properly, then it will be music to one's ears; if a software system has anomalies, then the music becomes distorted or worst just noise.

In embodiments of the present invention, a computer system or server dynamically maps monitoring data of a software system to the frequencies obtained from a mathematical transform (such as a Fourier transform) of user selected sound/music. The mathematical transform converts a time domain function into its frequency domain equivalent of sine and cosine frequencies. The computer system or server map monitoring datasets (e.g., container CPU utilization, memory consumption, disc usage, network traffic, dependency relationships, and trace spans) to the respective frequencies. Further, the computer system or server performs an inverse mathematical transform (such as an inverse Fourier transform) to recompose sound/music; the resulting sound/music can therefore represent a software system's internal state.

A software system is used as the context to describe embodiments of the present invention. It should be appreciated that the description of embodiments involving a software system is not intended to limit the invention. However, it should be noted that the disclosed approach is applicable to any monitored system. Here, several examples of monitoring performance of monitored systems are given as follows. The present invention may be also used to monitor performance of a hardware system. The present invention may be also used to monitor performance of a combination of a software system and a hardware system. The present invention may also be used to monitor performance of an infrastructural computing system or a could computing system.

Figure 1:
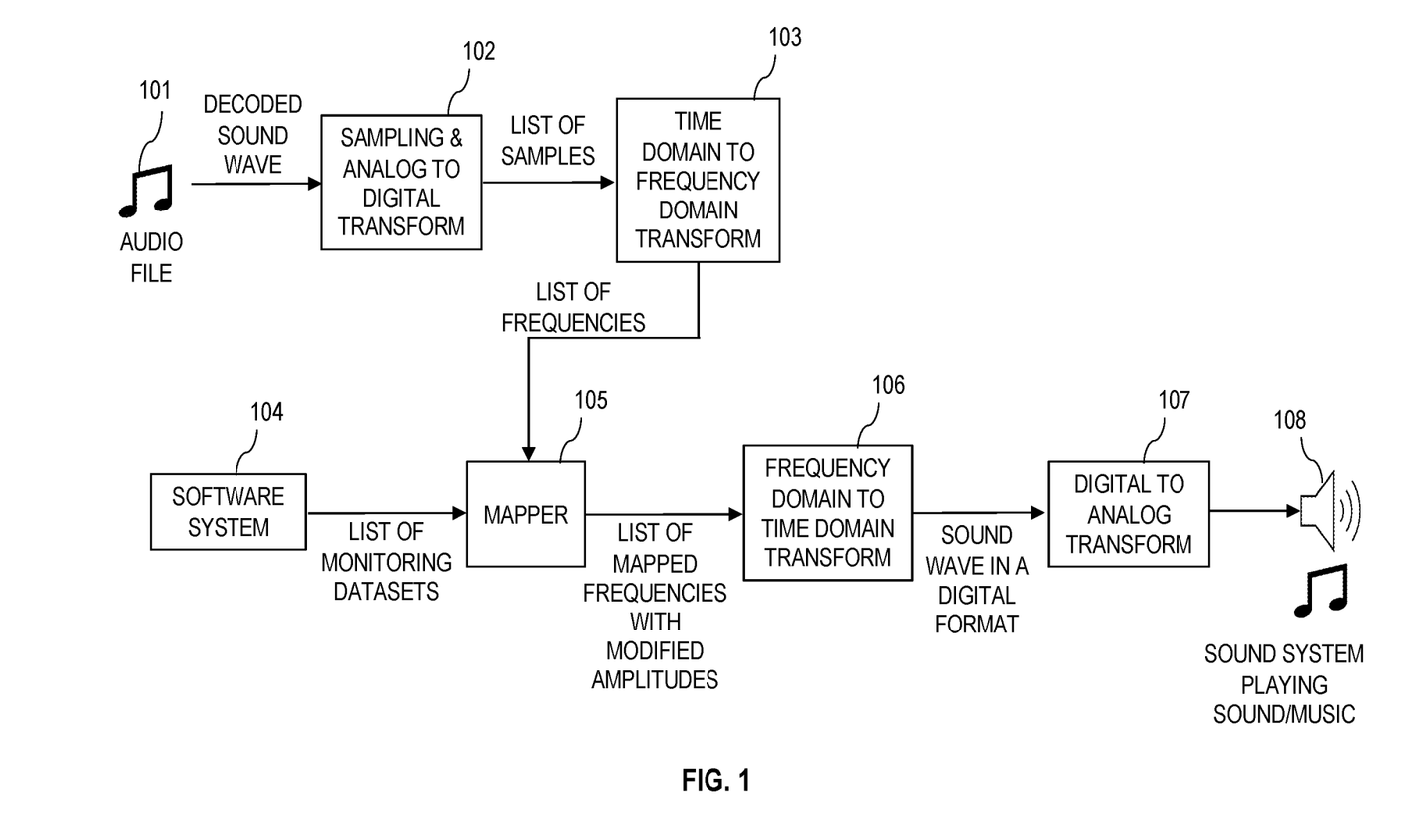
FIG. 1 is a systematic diagram illustrating a proposed approach to monitoring performance of a software system by playing sound/music, in accordance with one embodiment of the present invention.

FIG. 1 is a systematic diagram illustrating a proposed system for monitoring performance of a software system by playing sound/music, in accordance with one embodiment of the present invention. The proposed system is implemented on one or more computing devices or servers. A computing device or server is described in more detail in later paragraphs with reference to FIG. 3. The proposed system may be implemented in a cloud computing environment. The cloud computing environment is described in more detail in later paragraphs with reference to FIG. 4 and FIG. 5.

Audio file 101 is a sound/music file on a computer or from an online resource in a digital format. Audio file 101 includes sound/music preferred by a user, and the user selects the sound/music to listen to for the purpose of monitoring performance of software system 104.

The proposed system includes component 102 for sampling and analog to digital transform. Component 102 loads audio file 101. Component 102 resamples a decoded sound wave of audio file 101 at a predetermined sampling frequency, converting an analog representation of the sound/music to a digital format. In the resampling process, component 102 captures an array of amplitudes that represents the sound/music in a sequential order. For example, the "librosa" library in Python can perform loading and sampling of a music file into an array of amplitudes.

The proposed system further includes component 103 for a time domain to a frequency domain transform. Component 103 uses a mathematical transform, such as such as a Fourier transform, a Laplace transform, or a Z transform, to convert from a time domain of the array of amplitudes captured in the sampling process to a frequency domain. In other words, component 103 converts a time domain representation of sound/music to its frequency domain representation. For example, in one embodiment, a discrete Fourier transform is used to convert a finite sequence of samples of a function into a sequence of samples of a complex-valued function of frequency. The discrete Fourier transform transforms a sequence of N time domain amplitudes $\{x_n\}$: $=x_0, x_1, \ldots, x_{N-1}$ into sequences of complex numbers $\{X_k\}$: $=X_0, X_1, \ldots, X_{N-1}$ which is defined by $$X_k = \sum_{n=0}^{N-1} x_n e^{-\frac{i2\pi}{N}kn}.$$

The discrete Fourier transform breaks a time domain waveform into a summation of a list of sine and cosine waves with respective frequency and amplitude. The discrete Fourier transform is applied to the list of samples, this yields lists of complex numbers representing the sine and cosines waves that made up the sound/music in the frequency domain (or lists of frequencies).

The proposed system has a set of monitoring datasets (a list of monitoring datasets) of software system 104. The monitoring datasets includes, for example, container CPU (central processing unit) utilization, memory consumption, disc usage, network traffic, dependency relationships, and trace spans. The proposed system further has a set of frequencies (a list of frequencies) from component 103 which uses the mathematical transform (e.g., a Fourier transform) to convert the time domain representation to the frequency domain representation.

The proposed system further includes another component: mapper 105. Mapper 105 receives a list of monitoring datasets of software system 104 and a list of frequencies from component 103 (which is for transform from a time domain representation to a frequency domain representation). Using one or more mapping rules defined by a user, mapper 105 maps respective monitoring datasets to one or more of the frequencies obtained from the mathematical transform (e.g., a Fourier transform) performed by component 103. Different monitoring datasets are mapped to different frequencies. Each of the monitoring datasets may be mapped to multiple frequencies.

There are multiple ways to map a monitoring dataset to a frequency or frequencies obtained from the mathematical transform. In a simplest form, the monitoring dataset may represent a binary value. For example, a Kubernetes container is alive (represented by a value of 1) or not (represented by a value of 0). This monitoring dataset can be mapped to a particular frequency obtained from the Fourier transform. If a value of the dataset is 0, then the mapped frequency's amplitude becomes 0 accordingly. If a value of the dataset is 1, then the mapped frequency's amplitude remains unchanged.

In a case where a value of the dataset is a variable and varies over time, for example, the CPU (central processing unit) usage in a container may change as resources are being used at runtime, the monitoring dataset may be mapped to a particular frequency. A frequency obtained from the mathematical transform is represented by a complex number; the real part of the complex number represents the value on the axis and the imaginary part represents the axis value in a Cartesian plane, i.e., the real part represents the frequency and the imaginary part represents the amplitude of the frequency. The frequency's amplitude obtained from the mathematical transform may have a value very different from the value of the dataset. The dataset's normal operating value range is defined and normalized to the frequency's amplitude. If the dataset's value falls outside of a normal operating range, then the frequency's amplitude is proportionally increased or decreased according to some configuration rules.

A user can configure custom mapping rules. These rules can make use of these and other mapping techniques to map hundreds or more monitoring datasets to frequencies obtained from the Fourier transform. The mapping is not limited to a one-to-one mapping of a monitoring dataset to a frequency. One monitoring dataset may be mapped to multiple frequencies using the mapping techniques abovementioned to amplify the variation of the resulting sound/music. Mapper 105 outputs a list of mapped frequencies with modified amplitudes.

The proposed system further includes component 106 for the frequency domain to the time domain transform. With all the monitoring datasets being mapped to the frequencies, component 106 performs an inverse mathematical transform, such as an inverse Fourier transform, an inverse Laplace transform, or an inverse Z transform, to convert from the frequency domain representation back to the time domain representation and obtain a sound/music wave in a digital format. For example, the discrete Fourier transform is defined by $$x_n = \frac{1}{N} \sum_{k=0}^{N-1} X_k e^{\frac{i2\pi}{N} kn}.$$

The proposed system further includes component 107 which is a converter for digital to analog transform. Component 107 converts the sound/music wave in the digital format (which has been generated by component 106) to an analog format which can be played by sound system 108. The sound/music wave in the analog form (which is generated by component 107) is fed to sound system 108.

A user uses the sound/music played by sound system 108 to monitor performance of software system 104. The user compares the original sound/music from audio file 101 and the sound/music played by sound system 108 to determine whether software system 104 performs normally. If software system 104 performs within an expected range, then the sound/music played by sound system 108 will be the same as the original sound/music from audio file 101. If software system 104 performs out of an expected range, then the sound/music played by sound system 108 will be different from the original sound/music from audio file 101.

Figure 2:
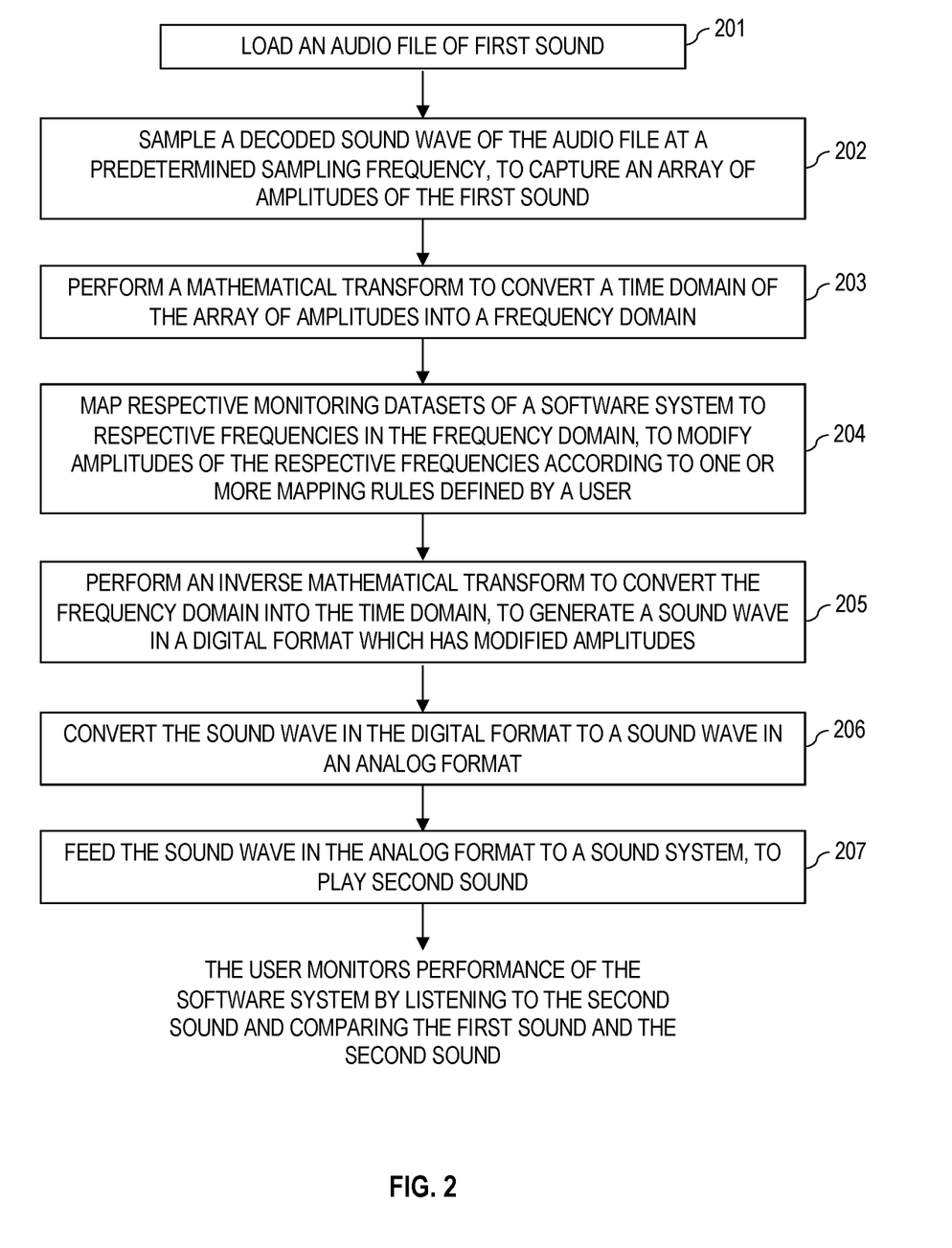
FIG. 2 is a flowchart showing operational steps of monitoring performance of a software system by playing sound/music, in accordance with one embodiment of the present invention.

FIG. 2 is a flowchart showing operational steps of monitoring performance of a software system by playing sound/music, in accordance with one embodiment of the present invention. The operational steps are implemented on one or more computing devices or servers. A computing device or server is described in more detail in later paragraphs with reference to FIG. 3. The operational steps may be implemented in a cloud computing environment. The cloud computing environment is described in more detail in later paragraphs with reference to FIG. 4 and FIG. 5.

At step 201, the one or more computing devices or servers loads an audio file of first sound. The audio file of first sound is sound/music preferred by a user and stored on a computer device or from an online resource. To determine whether the software system performs normally or within an expected range, the user will compare the first sound with second sound generated in later operation steps by the one or more computing devices or servers. In the embodiment shown in FIG. 1, the one or more computing devices or servers loads audio file 101.

At step 202, the one or more computing devices or servers sample a decoded sound wave of the audio file at a predetermined sampling frequency, to capture an array of amplitudes of the first sound. At this step, the one or more computing devices or servers convert an analog representation of the sound/music to a digital format. At this step, the one or more computing devices or servers generate a list of samples in a time domain. In the embodiment shown in FIG. 1, component 102 in the proposed system samples a decoded sound wave of audio file 101 and converts the analog format of the first sound to the digital format.

At step 203, the one or more computing devices or servers perform a mathematical transform to convert a time domain of the array of amplitudes into a frequency domain. The array of amplitudes captured at step 202 is in the time domain. At this step, the one or more computing devices or servers use the mathematical transform, such as a Fourier transform, a Laplace transform, or a Z transform, to convert the time domain to the frequency domain. The one or more computing devices or servers applies the mathematical transform to the list of samples in the time domain and generate a list of frequencies representing the sine and cosines waves that made up the sound/music in the frequency domain. In the embodiment shown in FIG. 1, component 103 in the proposed system performs the mathematical transform to convert the time domain into the frequency domain.

At step 204, the one or more computing devices or servers map respective monitoring datasets of a software system to respective frequencies in the frequency domain, to modify amplitudes of the respective frequencies according to one or more mapping rules defined by a user. The monitoring datasets includes, for example, container CPU (central processing unit) utilization, memory consumption, disc usage, network traffic, dependency relationships, and trace spans. The one or more computing devices or servers receive a list of the monitoring datasets of the software system and the list of frequencies generated at step 203, and then the one or more computing devices or servers map the respective monitoring datasets to the respective frequencies obtained at step 203. The one or more computing devices or servers generate a list of mapped frequencies with modified amplitudes. In the embodiment shown in FIG. 1, mapper 105 in the proposed system maps respective monitoring datasets of software system 104 to frequencies in the list of frequencies from component 103.

At step 205, the one or more computing devices or servers perform an inverse mathematical transform to convert the frequency domain into the time domain, to generate a sound wave in a digital format which has modified amplitudes. At this step, the one or more computing devices or servers use the inverse mathematical transform, such as an inverse Fourier transform, an inverse Laplace transform, or an inverse Z transform, to convert the frequency domain back to the time domain. In the embodiment shown in FIG. 1, component 106 in the proposed system receives the list of mapped frequencies with modified amplitudes inputted from mapper 105, performs the inverse mathematical transform, and generates a sound/music wave in a digital form.

At step 206, the one or more computing devices or servers convert the sound wave in the digital format to a sound wave in an analog format. At this step, the one or more computing devices or servers convert the sound/music wave generated at step 205 to the analog format which can be played by a sound system. In the embodiment shown in FIG. 1, component 107 in the proposed system receives the sound wave in a digital format from component 106 and converts the sound wave from the digital format to the analog format which can be played by sound system 108.

At step 207, the one or more computing devices or servers feed the sound wave in the analog format to a sound system, to play second sound. The sound wave in the analog format is generated at step 206. The second sound generated from the sound wave in the analog format may be different from the first sound generated from the audio file. A user monitors performance of the software system by listening to the second sound and comparing the first sound and the second sound. If the software system performs within an expected range, then the second sound played by the sound system will be the same as the first sound from the audio file. If the software system performs out of an expected range, then the second sound will be different from the first sound.

Figure 3:
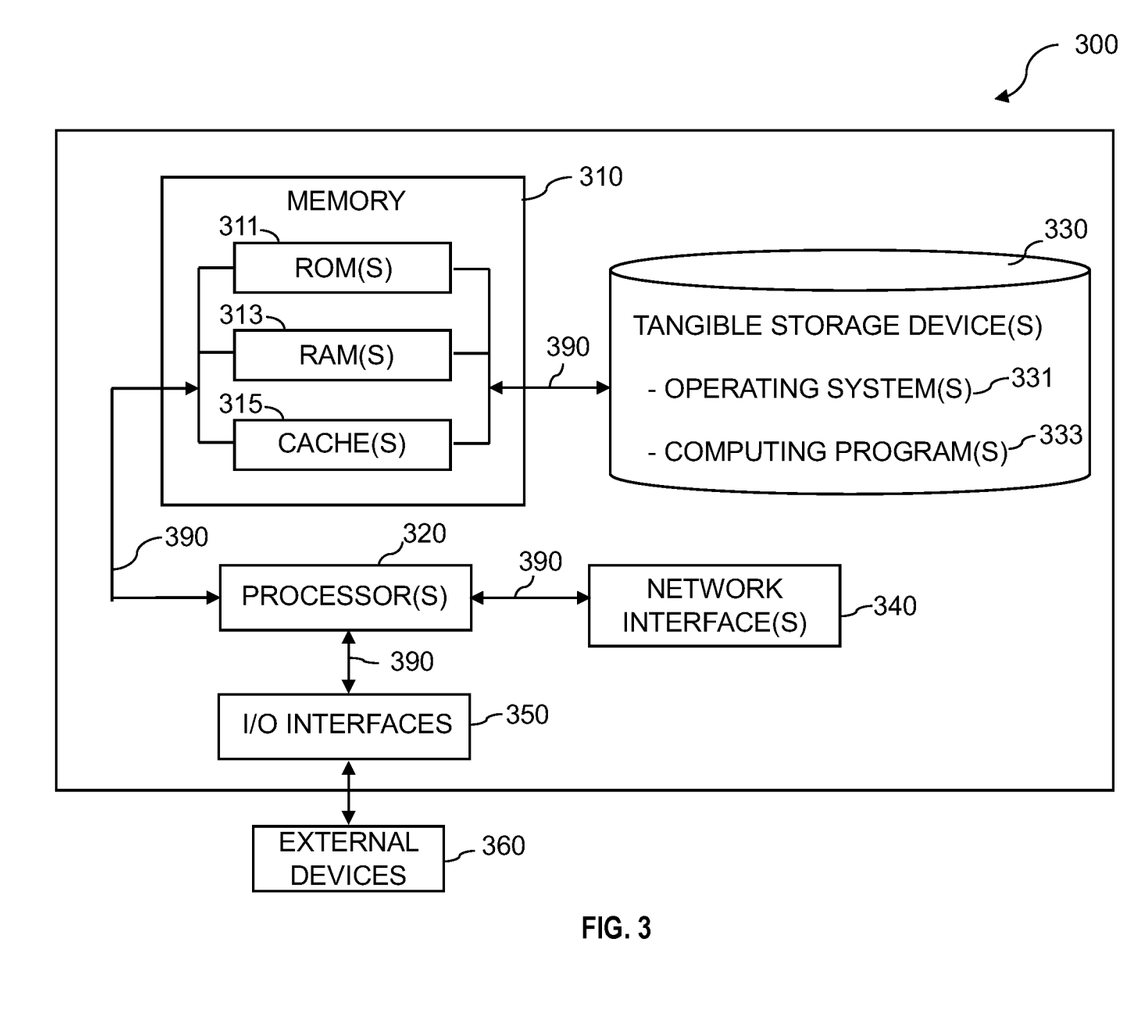
FIG. 3 is a diagram illustrating components of a computing device or server, in accordance with one embodiment of the present invention.

FIG. 3 is a diagram illustrating components of a computing device or server, in accordance with one embodiment of the present invention. It should be appreciated that FIG. 3 provides only an illustration of one implementation and does not imply any limitations; different embodiments may be implemented.

Referring to FIG. 3, computing device or server 300 includes processor(s) 320, memory 310, and tangible storage device(s) 330. In FIG. 3, communications among the above-mentioned components of computing device or server 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330.

Computing device or server 300 further includes I/O interface(s) 350. I/O interface(s) 350 allows for input and output of data with external device(s) 360 that may be connected to computing device or server 300. Computing device or server 300 further includes network interface(s) 340 for communications between computing device or server 300 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
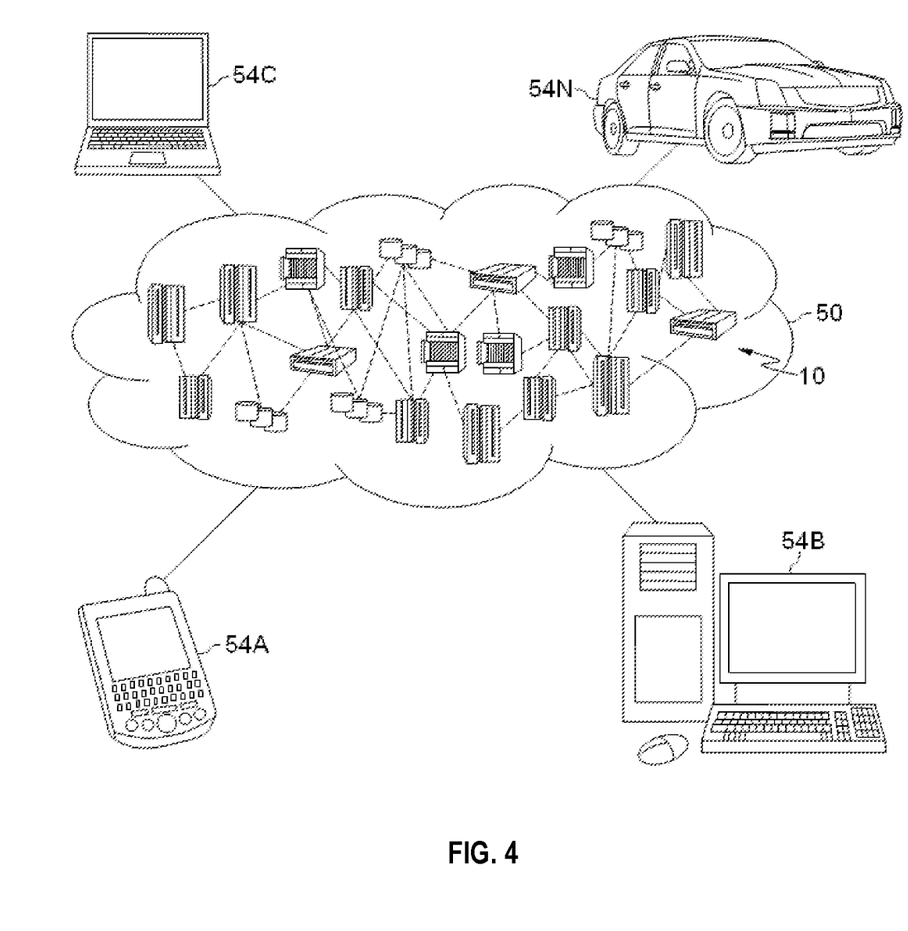
FIG. 4 depicts a cloud computing environment, in accordance with one embodiment of the present invention.

Referring now to FIG. 4, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 5:
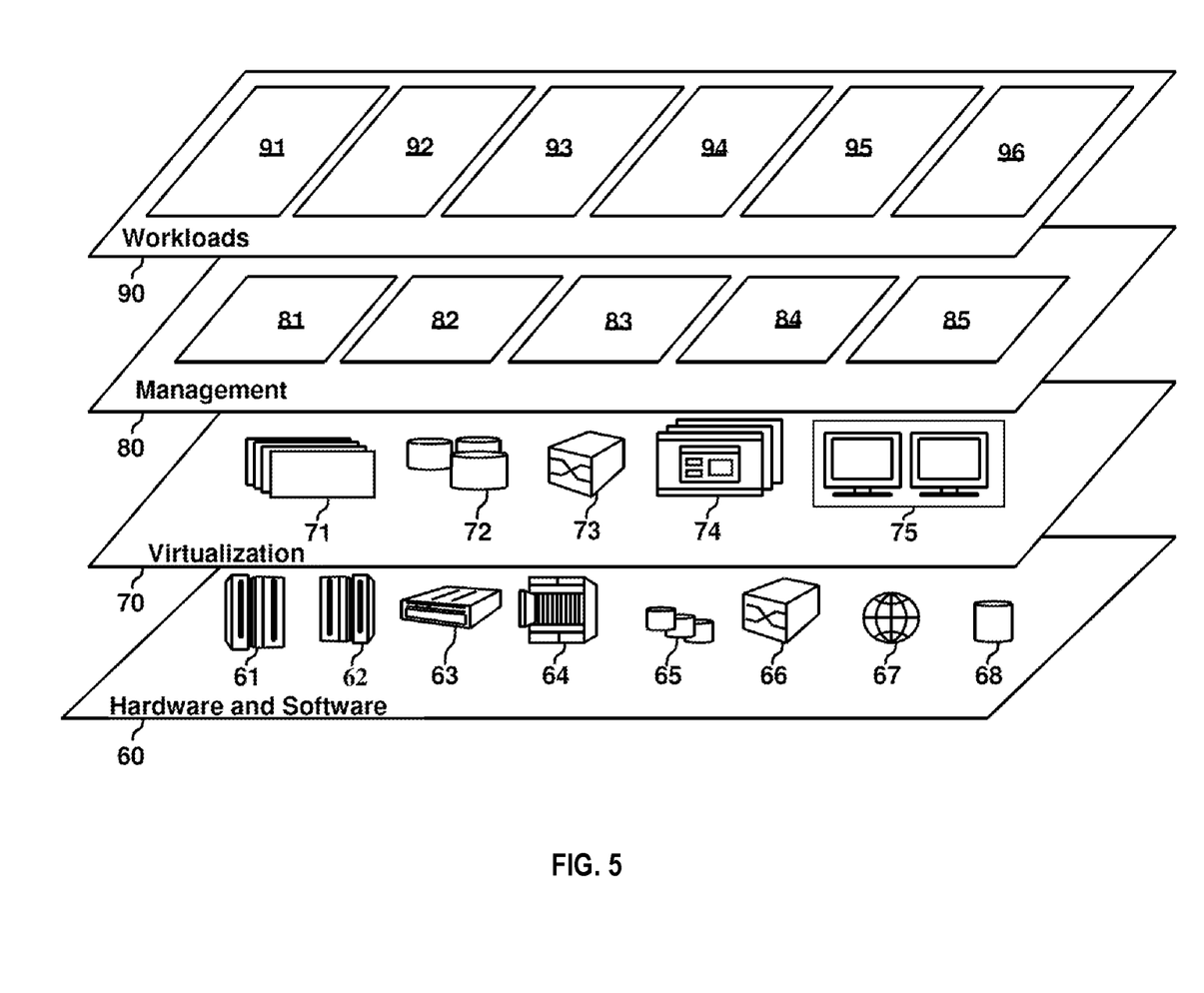
FIG. 5 depicts abstraction model layers in a cloud computing environment, in accordance with one embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of system monitoring by playing sound/music which represents internal states of a monitored system in near real-time.

What is claimed is:

1. A computer-implemented method for system monitoring, the method comprising:
converting a time domain representation of a first sound into a frequency domain representation;
mapping respective monitoring datasets of a monitored system to respective frequencies in the frequency domain representation;
modifying amplitudes of the respective frequencies according to one or more mapping rules defined by a user by: normalizing an operating range of a respective one of the monitoring datasets to one of the respective frequencies; and proportionally increasing or decreasing the amplitude of one of the respective frequencies in response to a value of the respective one of the monitoring datasets being outside of the operating range;
converting the frequency domain representation into the time domain representation to generate a sound wave in a digital format which has modified amplitudes;
converting the sound wave in the digital format to a sound wave in an analog format;
feeding the sound wave in the analog format to a sound system to play a second sound; and
wherein performance of the monitored system is configured to be monitored by the user listening to the second sound and comparing the first sound and the second sound.

2. The computer-implemented method of claim 1, further comprising:
loading an audio file of the first sound; and
sampling a decoded sound wave of the audio file at a predetermined sampling frequency to capture the array of the amplitudes of the first sound.

3. The computer-implemented method of claim 1, wherein converting the time domain representation into the frequency domain representation is by performing a Fourier transform, wherein converting the frequency domain representation into the time domain representation is by performing an inverse Fourier transform.

4. The computer-implemented method of claim 1, wherein converting the time domain representation into the frequency domain representation is by performing a Laplace transform, wherein converting the frequency domain representation into the time domain representation is by performing an inverse Laplace transform.

5. The computer-implemented method of claim 1, wherein converting the time domain representation into the frequency domain representation is by performing a Z transform, wherein converting the frequency domain representation into the time domain representation is by performing an inverse Z transform.

6. The computer-implemented method of claim 1, wherein one of the respective monitoring datasets is mapped to one or more of the respective frequencies.

7. The computer-implemented method of claim 1, wherein:
the first sound comprises music selected by the user; and
the second sound played by the sound system is the same as the first sound based on the computing system performing within an expected range or the second sound played by the sound system is not the same as the first sound based on the computing system not performing within the expected range.

8. A computer program product for system monitoring, the computer program product comprising a computer readable storage medium having program instructions embodied therewith, the program instructions executable by one or more processors, the program instructions executable to:
convert a time domain representation of a first sound into a frequency domain representation;

map respective monitoring datasets of a monitored system to respective frequencies in the frequency domain representation;

modify amplitudes of the respective frequencies according to one or more mapping rules defined by a user by normalizing an operating range of a respective one of the monitoring datasets to one of the respective frequencies;

convert the frequency domain representation into the time domain representation to generate a sound wave in a digital format which has modified amplitudes;

convert the sound wave in the digital format to a sound wave in an analog format;

feed the sound wave in the analog format to a sound system to play a second sound; and wherein performance of the monitored system is configured to be monitored by the user listening to the second sound and comparing the first sound and the second sound.

9. The computer program product of claim 8, further comprising the program instructions executable to:
load an audio file of the first sound; and
sample a decoded sound wave of the audio file at a predetermined sampling frequency to capture the array of the amplitudes of the first sound.

10. The computer program product of claim 8, wherein converting the time domain representation into the frequency domain representation is by performing a Fourier transform, wherein converting the frequency domain representation into the time domain representation is by performing an inverse Fourier transform.

11. The computer program product of claim 8, wherein converting the time domain representation into the frequency domain representation is by performing a Laplace transform, wherein converting the frequency domain representation into the time domain representation is by performing is an inverse Laplace transform.

12. The computer program product of claim 8, wherein converting the time domain representation into the frequency domain representation is by performing a Z transform, wherein converting the frequency domain representation into the time domain representation is by performing an inverse Z transform.

13. The computer program product of claim 8, wherein one of the respective monitoring datasets is mapped to one or more of the respective frequencies.

14. A computer system for system monitoring, one or more computer readable tangible storage devices, and program instructions stored on at least one of the one or more computer readable tangible storage devices for execution by at least one of the one or more processors, the program instructions executable to:

convert a time domain representation of a first sound into a frequency domain representation;

map respective monitoring datasets of a monitored system to respective frequencies in the frequency domain representation;

modify amplitudes of the respective frequencies by normalizing an operating range of a respective one of the monitoring datasets to one of the respective frequencies;

convert the frequency domain representation into the time domain representation to generate a sound wave which has modified amplitudes;

feed the sound wave to a sound system to play a second sound; and wherein performance of the monitored system is configured to be monitored by the user listening to the second sound and comparing the first sound and the second sound.

15. The computer system of claim 14, further comprising the program instructions executable to:
load an audio file of the first sound; and
sample a decoded sound wave of the audio file at a predetermined sampling frequency to capture the array of the amplitudes of the first sound.

16. The computer system of claim 14, wherein converting the time domain representation into the frequency domain representation is by performing a Fourier transform, wherein converting the frequency domain representation into the time domain representation is by performing an inverse Fourier transform.

17. The computer system of claim 14, wherein converting the time domain representation into the frequency domain representation is by performing a Laplace transform, wherein converting the frequency domain representation into the time domain representation is by performing an inverse Laplace transform.

18. The computer system of claim 14, wherein converting the time domain representation into the frequency domain representation is by performing a Z transform, wherein converting the frequency domain representation into the time domain representation is by performing an inverse Z transform.

19. The computer system of claim 14, wherein one of the respective monitoring datasets is mapped to one or more of the respective frequencies.

20. The computer system of claim 14, wherein the modifying amplitudes of the respective frequencies further comprises:
proportionally increasing or decreasing the amplitude of one of the respective frequencies in response to a value of the respective one of the monitoring datasets being outside of the operating range.

* * * * *